United States Patent [19]
Benson

[11] Patent Number: 6,109,009
[45] Date of Patent: Aug. 29, 2000

[54] CONSTANT SPEED CONTROL FOR ELECTRIC GREENS MOWER

[75] Inventor: Terrance G. Benson, Union Grove, Wis.

[73] Assignee: Textron Inc., Providence, R.I.

[21] Appl. No.: 09/008,188

[22] Filed: Jan. 16, 1998

[51] Int. Cl.$^7$ .................................................. A01D 35/00
[52] U.S. Cl. ........................................................ 56/10.2 G
[58] Field of Search .......................... 56/10.2 R, 10.2 A,
56/10.2 G, 10.5, 11.2, 11.1, 13.5, 11.9,
DIG. 15

[56] References Cited

U.S. PATENT DOCUMENTS

| | | |
|---|---|---|
| 1,401,156 | 12/1921 | Jenkins . |
| 2,057,417 | 10/1936 | Clapper . |
| 2,192,468 | 3/1940 | Gore . |
| 2,417,613 | 3/1947 | Radabaugh . |
| 2,567,065 | 9/1951 | Ginsterblum . |
| 2,586,273 | 2/1952 | Steven . |
| 2,597,735 | 5/1952 | Jepson . |
| 2,792,898 | 5/1957 | Mast . |
| 2,959,174 | 11/1960 | Anderson . |
| 3,003,586 | 10/1961 | Loef et al. . |
| 3,027,961 | 4/1962 | Rogant . |
| 3,061,031 | 10/1962 | Packard . |
| 3,090,184 | 5/1963 | Hadek . |

(List continued on next page.)

FOREIGN PATENT DOCUMENTS

| | | |
|---|---|---|
| B-54961/91 | of 1992 | Australia . |
| 2 636 498 | 3/1990 | France . |
| 2101 518 | 1/1971 | Germany . |
| 2101 519 | 1/1971 | Germany . |
| 2141 706 | 8/1971 | Germany . |
| 25 45 629 | 10/1975 | Germany . |
| 46-16930 | 5/1971 | Japan . |
| 48-16296 | 5/1973 | Japan . |
| 49-33149 | 9/1974 | Japan . |
| 50-2897 | 1/1975 | Japan . |
| 52-53648 | 12/1977 | Japan . |
| 53-14283 | 5/1978 | Japan . |
| 56-75015 | 6/1981 | Japan . |
| 57-67505 | 4/1982 | Japan . |
| 2-55521 | 4/1990 | Japan . |
| 5-15233 | 1/1993 | Japan . |
| 5-506152 | 9/1993 | Japan . |
| 5-85206 | 11/1993 | Japan . |
| 1 376 008 | 12/1974 | United Kingdom . |
| WO 90/10416 | 9/1990 | WIPO . |
| WO 91/15107 | 4/1991 | WIPO . |
| WO 93/1264 | 7/1993 | WIPO . |

OTHER PUBLICATIONS

Toro Brochure entitled "Greensmaster® 3100" dated 1993.
Owner's Manual and Parts List for Jacobsen 22" Electric Putting Green Mower, Model 110, Serial No. 1601–Up, pp. 1–15 (No Date).
Toro Brochure entitled "What mower gives greens the kindest cut of all?" dated Feb. 1994.
Jacobsen Brochure for Tri–King™ Triplex Mowers dated 1992.
Ransomes Brochure—(No Date).
Article entitled "Internally Powered Conveyors Rollers," Sparks Belting Col, Mar. 1995.
Brochure for Interroll Powerroll Motorized Pulleys, Section 6—(No Date).
MTC Since 1946—Materials Transportation Company—Battery Handling Equipment Catalog #894—(No Date).
Pols Zudland Photograph, (No Date).

*Primary Examiner*—Robert E. Pezzuto
*Attorney, Agent, or Firm*—Harness, Dickey & Pierce, P.L.C.

[57] ABSTRACT

An electric mower having constant speed control. The mower is powered by a battery and a controller connected to the electric motor. The controller monitors mower operation and ensures that a constant speed is maintained while mowing and transporting even on inclines and declines.

22 Claims, 4 Drawing Sheets

U.S. PATENT DOCUMENTS

| | | |
|---|---|---|
| 3,103,909 | 9/1963 | Campbell . |
| 3,106,811 | 10/1963 | Heth et al. . |
| 3,169,358 | 2/1965 | Ertsgaard et al. . |
| 3,212,244 | 10/1965 | Wilgus . |
| 3,217,824 | 11/1965 | Jepson . |
| 3,229,452 | 1/1966 | Hasenbank . |
| 3,230,695 | 1/1966 | West . |
| 3,339,353 | 9/1967 | Schreyer . |
| 3,404,516 | 10/1968 | Carlson . |
| 3,404,518 | 10/1968 | Kasper . |
| 3,410,063 | 11/1968 | Speiser . |
| 3,425,197 | 2/1969 | Kita . |
| 3,429,110 | 2/1969 | Strasel . |
| 3,472,005 | 10/1969 | Profenna . |
| 3,496,706 | 2/1970 | Mattson . |
| 3,511,033 | 5/1970 | Strasel . |
| 3,511,034 | 5/1970 | Strasel . |
| 3,511,035 | 5/1970 | Strasel . |
| 3,516,233 | 6/1970 | Johnson et al. . |
| 3,550,714 | 12/1970 | Bellinger . |
| 3,563,011 | 2/1971 | Ramley et al. . |
| 3,563,012 | 2/1971 | Strasel . |
| 3,570,226 | 3/1971 | Haverkamp et al. . |
| 3,570,227 | 3/1971 | Bellinger . |
| 3,572,455 | 3/1971 | Brueske . |
| 3,581,480 | 6/1971 | Connor et al. . |
| 3,602,772 | 8/1971 | Hundhausen . |
| 3,603,065 | 9/1971 | Weber . |
| 3,608,284 | 9/1971 | Erdman . |
| 3,608,285 | 9/1971 | Berk . |
| 3,612,573 | 10/1971 | Hoffman . |
| 3,613,337 | 10/1971 | Akgulian et al. . |
| 3,631,659 | 1/1972 | Horowitz . |
| 3,641,749 | 2/1972 | Dwyer, Jr. et al. . |
| 3,650,097 | 3/1972 | Nokes . |
| 3,668,844 | 6/1972 | Akgulian et al. . |
| 3,698,523 | 10/1972 | Bellinger . |
| 3,721,076 | 3/1973 | Behrens . |
| 3,729,912 | 5/1973 | Weber . |
| 3,731,469 | 5/1973 | Akgulian et al. . |
| 3,732,671 | 5/1973 | Allen et al. . |
| 3,732,673 | 5/1973 | Winn, Jr. . |
| 3,742,685 | 7/1973 | Lian et al. . |
| 3,759,019 | 9/1973 | Wells . |
| 3,779,237 | 12/1973 | Goeltz et al. . |
| 3,800,480 | 4/1974 | Keating . |
| 3,809,972 | 5/1974 | Wick . |
| 3,809,975 | 5/1974 | Bartels . |
| 3,821,997 | 7/1974 | Sieren . |
| 3,832,835 | 9/1974 | Hall et al. . |
| 3,841,069 | 10/1974 | Weck . |
| 3,895,481 | 7/1975 | Olney et al. . |
| 3,910,016 | 10/1975 | Saiia et al. . |
| 3,918,240 | 11/1975 | Haffner et al. . |
| 3,924,389 | 12/1975 | Kita . |
| 3,939,917 | 2/1976 | Reed, Jr. et al. . |
| 3,940,924 | 3/1976 | Miyada . |
| 3,958,398 | 5/1976 | Fuelling, Jr. et al. . |
| 3,977,163 | 8/1976 | Olin et al. . |
| 3,992,858 | 11/1976 | Hubbard et al. . |
| 3,999,643 | 12/1976 | Jones . |
| 4,021,996 | 5/1977 | Bartlett et al. . |
| 4,024,448 | 5/1977 | Christianson et al. . |
| 4,040,497 | 8/1977 | Thomas . |
| 4,042,055 | 8/1977 | Ward . |
| 4,064,680 | 12/1977 | Fleigle . |
| 4,145,864 | 3/1979 | Brewster, Jr. . |
| 4,161,858 | 7/1979 | Gerrits . |
| 4,180,964 | 1/1980 | Pansire . |
| 4,187,923 | 2/1980 | McClure, III et al. . |
| 4,191,007 | 3/1980 | Check et al. . |
| 4,265,146 | 5/1981 | Horrell . |
| 4,301,881 | 11/1981 | Griffin . |
| 4,306,402 | 12/1981 | Whimp . |
| 4,306,404 | 12/1981 | Szymanis et al. . |
| 4,307,559 | 12/1981 | Jupp et al. . |
| 4,318,266 | 3/1982 | Taube . |
| 4,318,449 | 3/1982 | Salisbury . |
| 4,330,981 | 5/1982 | Hall et al. . |
| 4,333,302 | 6/1982 | Thomas et al. . |
| 4,335,569 | 6/1982 | Keeney et al. . |
| 4,354,569 | 10/1982 | Eichholz . |
| 4,370,846 | 2/1983 | Arnold . |
| 4,395,865 | 8/1983 | Davis, Jr. et al. . |
| 4,430,604 | 2/1984 | Loganbill et al. . |
| 4,470,476 | 9/1984 | Hunt . |
| 4,479,346 | 10/1984 | Chandler . |
| 4,487,006 | 12/1984 | Scag . |
| 4,494,365 | 1/1985 | Lloyd . |
| 4,497,160 | 2/1985 | Mullet et al. . |
| 4,511,304 | 4/1985 | Woodruff . |
| 4,546,601 | 10/1985 | Skovhoj . |
| 4,559,768 | 12/1985 | Dunn . |
| 4,589,249 | 5/1986 | Walker et al. . |
| 4,593,779 | 6/1986 | Krohling . |
| 4,597,203 | 7/1986 | Middleton . |
| 4,613,151 | 9/1986 | Kielczewski . |
| 4,642,976 | 2/1987 | Owens . |
| 4,663,920 | 5/1987 | Skovhoj . |
| 4,667,460 | 5/1987 | Kramer . |
| 4,680,922 | 7/1987 | Arnold . |
| 4,685,280 | 8/1987 | Lloyd et al. . |
| 4,686,445 | 8/1987 | Phillips . |
| 4,718,286 | 1/1988 | Eller . |
| 4,724,662 | 2/1988 | Giandenoto et al. . |
| 4,750,319 | 6/1988 | Aldred . |
| 4,756,375 | 7/1988 | Ishikura et al. . |
| 4,770,595 | 9/1988 | Thompson et al. . |
| 4,815,259 | 3/1989 | Scott . |
| 4,866,917 | 9/1989 | Phillips et al. . |
| 4,870,811 | 10/1989 | Steele . |
| 4,878,338 | 11/1989 | Aldred et al. . |
| 4,882,896 | 11/1989 | Wilcox . |
| 4,887,686 | 12/1989 | Takei et al. . |
| 4,897,013 | 1/1990 | Thompson et al. . |
| 4,920,733 | 5/1990 | Berrios . |
| 4,942,723 | 7/1990 | Wassell . |
| 4,943,758 | 7/1990 | Tsurumiya . |
| 4,947,630 | 8/1990 | Rich et al. . |
| 4,964,265 | 10/1990 | Young . |
| 4,964,266 | 10/1990 | Kolb . |
| 4,967,543 | 11/1990 | Scag et al. . |
| 4,980,539 | 12/1990 | Walton . |
| 4,987,729 | 1/1991 | Paytas . |
| 4,995,227 | 2/1991 | Foster . |
| 5,007,234 | 4/1991 | Shurman et al. . |
| 5,042,236 | 8/1991 | Lamusga et al. . |
| 5,042,239 | 8/1991 | Card . |
| 5,062,322 | 11/1991 | Sinko . |
| 5,069,022 | 12/1991 | Vandermark . |
| 5,085,043 | 2/1992 | Hess et al. . |
| 5,088,596 | 2/1992 | Agnoff . |
| 5,105,608 | 4/1992 | Knez . |
| 5,123,234 | 6/1992 | Harada et al. . |
| 5,133,174 | 7/1992 | Parsons, Jr. . |
| 5,140,249 | 8/1992 | Linder et al. . |
| 5,150,021 | 9/1992 | Kamono et al. . |
| 5,156,226 | 10/1992 | Boyer et al. . |
| 5,163,273 | 11/1992 | Wojkowski et al. . |
| 5,203,147 | 4/1993 | Long . |
| 5,204,814 | 4/1993 | Noonan et al. . |
| 5,251,721 | 10/1993 | Örtenheim . |

| | | | | | | |
|---|---|---|---|---|---|---|
| 5,253,729 | 10/1993 | Suzuki . | | 5,406,778 | 4/1995 | Lamb et al. . |
| 5,261,213 | 11/1993 | Humphrey . | | 5,412,932 | 5/1995 | Schueler . |
| 5,285,862 | 2/1994 | Furutani et al. . | | 5,417,193 | 5/1995 | Fillman et al. . |
| 5,293,729 | 3/1994 | Curry et al. . | | 5,501,289 | 3/1996 | Nishikawa et al. . |
| 5,301,494 | 4/1994 | Peot et al. . | | 5,502,957 | 4/1996 | Robertson . |
| 5,309,699 | 5/1994 | Ehn, Jr. . | | 5,513,721 | 5/1996 | Ogawa et al. . |
| 5,319,368 | 6/1994 | Poholek . | | 5,540,037 | 7/1996 | Lamb et al. . |
| 5,322,140 | 6/1994 | Bussinger . | | 5,552,240 | 9/1996 | Derstine . |
| 5,323,593 | 6/1994 | Cline et al. . | | 5,553,445 | 9/1996 | Lamb et al. . |
| 5,330,138 | 7/1994 | Schlessmann . | | 5,565,760 | 10/1996 | Ball et al. . |
| 5,343,680 | 9/1994 | Reichen et al. . | | 5,642,023 | 6/1997 | Journey . |

CONSTANT SPEED CONTROL FOR ELECTRIC GREENS MOWER

BACKGROUND OF THE INVENTION

1. Field of the Invention

This invention relates in general to electrically powered mowers and relates more particularly to such a mower with the ability to maintain a constant speed on inclines and declines.

2. Background of the Invention

Mowing golf courses requires a precise mower designed and engineered to ensure a closely cropped and consistently cut green. In addition, because of the time required to grow a mature green and the cost associated with starting and maintaining a golf course, it is extremely important that the greens mower operate properly and not damage the green.

Golf course greens maintenance equipment traditionally has utilized internal combustion engines. A number of greens mowers are known in the art. Some are discussed in U.S. Pat. Nos. 3,429,110, and 4,021,996. Riding greens mowers with multiple or gang cutting units are the subject of U.S. Pat. Nos. 3,511,033, 3,668,844, 4,866,917, and 5,042,236. The mowers discussed in these patents all rely on an internal combustion engine as a source of power, and a complex drive mechanism or hydrostatic system for supplying power to the ground engaging wheels and the reel mowing units. However, there are a number of problems associated with the use of a golf course vehicle incorporating an internal combustion engine. First, fuel or hydraulic fluid can leak from the vehicle onto the green and damage the grass. Furthermore, it is inconvenient to service internal combustion engines, and it is inconvenient and hazardous to obtain and store the necessary fuel. Finally, internal combustion engines are a source of both noise and air pollution, and many U.S. cities have recently enacted noise and air pollution prevention statutes that severely limit the time of day and the duration that internal combustion golf course vehicles may be operated.

Taking into consideration the above noted risks and concerns associated with internal combustion engines, battery-powered mowers have become a viable alternative to conventional internal combustion powered greens mowers. Historically, most electric vehicles have utilized series motor designs because of their ability to produce very high levels of torque at low speeds. The current electric greens mowers, however, have a distinct disadvantage relative to internal combustion engine mowers: since they operate by electric motor, their speed varies on inclines and declines that are greater than about 5 degrees. Such a variation in speed is undesirable because the cutting reels are typically operating at a constant speed. A reel mower is designed to have a certain frequency of clip, wherein a reel blade passes across the bedknife at a certain rate as the machine moves forward. For example, if the height of cut is 0.250 inches, a reel blade will pass the bedknife every 0.250 inches of forward travel. Therefore, since riding Greens Mowers typically have fixed reel speed, any increase in ground speed will cause the machine to move forward farther than what is optimal and cause an uneven, wavy cut that is called marcelling.

Two of the main goals of any type of riding greens mower, whether electrically powered or otherwise, are maintaining the desired cutting height and sustaining an even quality of cut provided by the reels. The ability of the cutting reels to maintain the desired quality of cut depends upon the consistency of the ground speed of the mower. Those skilled in the art will appreciate that variations in terrain and turf conditions affect the ground speed and the quality of cut of an electric greens mower such as disclosed in U.S. Pat. No. 5,406,778.

Internal combustion or hydraulically powered greens mowers incorporate dynamic braking to ensure that the mower maintains a constant ground speed. Dynamic braking is a technique in which retarding force is supplied by the same device that originally was the driving motor. Such braking occurs in an hydraulic system when the operator releases the acceleration pedal. The hydraulic circuit builds pressure internally, creating the braking action, and the motor turns relative to the speed of the hydraulic pump and not faster. The engine, therefore, acts as a brake.

In an electrically powered greens mower, however, dynamic braking, as previously described, is not possible. Rather, when the operator releases the pedal, the voltage applied to the motor drops and the motor enters into a free wheel mode, where the revolution of the electric motor is not inhibited as in the hydraulic motor. As long as the electric mower is coasting on a decline, the electric motor will continue to increase speed. When the mower reaches level ground or an incline, the electric motor will begin to slow gradually until it stops, thus stopping the mower. When operating a mower using this sort of electric motor, the operator must constantly monitor and adjust the ground speed. Those skilled in the art will recognize that the varying speed of the mower is a detraction from using the electrically powered greens maintenance devices of the prior art since the relationship between ground speed and reel speed is not always constant, and marcelling will often result.

Accordingly, there is a need for an electric greens mower that includes a constant speed control mechanism that will prevent the electric motor from entering a free wheel mode, minimize marcelling, and improve the quality of the cut provided by the electric mower.

SUMMARY OF THE INVENTION

According to the present invention, there is provided an electrically driven greens mower having a novel traction speed control mechanism.

The present invention provides a traction speed control mechanism for an electrically powered mower to allow the mower to travel at a fixed speed over varying turf conditions. The mechanism includes a separately excited shunt motor, a feedback loop system from the motor, and a controller to electrically adjust the field and armature current to regulate the speed of the mower. This feature allows the mower to run at a near constant speed and to provide a high quality cut, and it does not require the operator to manually regulate the speed.

These and other advantages and features which characterize the present invention are pointed out with particularity in the following detailed description of the preferred embodiment, the drawings and the claims.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE PREFERRED EMBODIMENT

Figure 1:
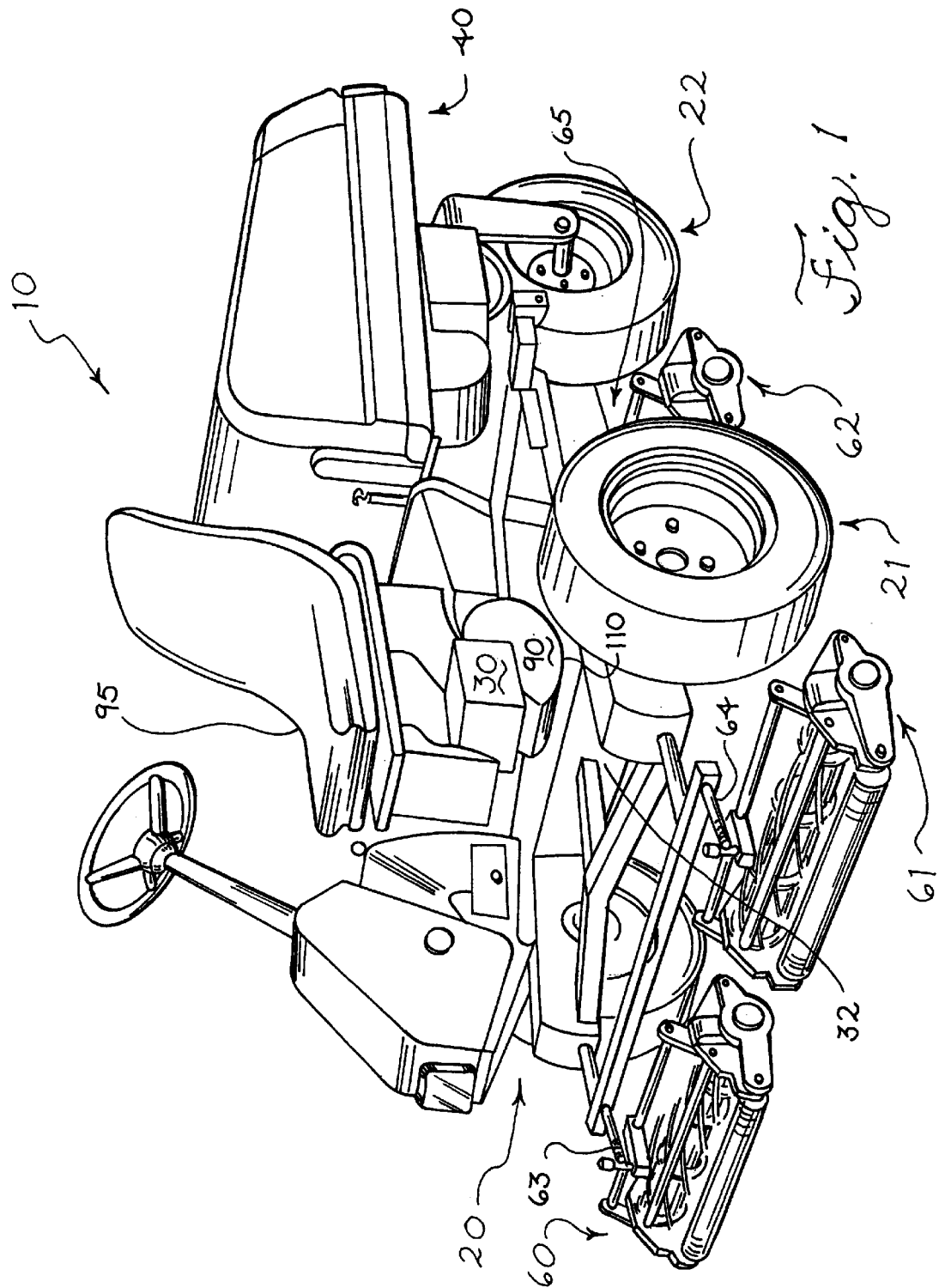
FIG. 1 is a general drawing of an electric greens mower incorporating the traction speed control system of the present invention.

In the figures, FIG. 1 is a general illustration of a mower 10 incorporating the traction speed control system of the present invention. Although the invention is described with respect to the preferred embodiment, those skilled in the art will recognize that other versions of the mower 10 are possible and that the invention is not limited to any specific embodiment.

In the embodiment shown in FIG. 1, the mower 10 includes three wheels 20, 21, and 22. Two front drive wheels 20 and 21 are powered by a drive motor 30. The rear wheel 22 is positioned behind and between the two front drive wheels 20 and 21 and is pivotable to steer the mower 10. The cutting units 60, 61, and 62 are ideally reel cutting units. The present invention, however, could also be used with rotary cutting units or other sorts of cutting units while still remaining within the spirit and scope of the invention. In FIG. 1, the cutting units 60, 61, and 62 are positioned ahead of each of the wheels 20, 21, and 22 respectively. Of course other positions are possible. The cutting units 60, 61, and 62 are optionally mounted on lift arms 63, 64, and 65. The operator selectively raises and lowers the lift arms 63, 64, and 65 depending on which cutting unit the operator wishes to use or to service.

The electric drive motor 30 drives the mower 10, is powered by a battery set 40, and is controlled by a controller 100 (not shown). Instead of a battery set 40, a generator could also be used, or any other electrical power supply. The motor is preferably a separately excited DC shunt motor, and the controller 100 (not shown) is preferably a separately excited (SX) Transistorized Motor Controller made by General Electric (GE), and disclosed in the March 1997 Electric Vehicle Motors and Controls Installation and Operation Manual that is hereby incorporated by reference. Of course, other types of motors, including but not limited to switched reluctance motors, brushless DC permanent magnet motors, stepper motors, and AC induction motors, and compatible controllers could be used while still remaining within the spirit and scope of the invention.

The operator's seat 95 is positioned above the front axle 32. In one preferred embodiment, the traction speed control system 90 including controller 100 (not shown) is centrally located in an enclosure 110 underneath the seat 95 and above the front axle 32. The traction speed control system 90 could be located almost anywhere on the mower 10, but, in the preferred embodiment, it is placed underneath the seat 95 for easy access during servicing. The enclosure 110 is for mounting convenience and protection from the environment.

As described above, the controller 100 (not shown) is powered by battery set 40. In the preferred embodiment, the traction speed control system 90 operates on a 48 volt DC battery system. (See FIG. 2) Usually eight batteries are in the battery set 40, although a different number can be used depending on the desired operating voltage, the range of the battery set 40, and the size of the mower 10. Although lead-acid batteries are preferred, other types of batteries can be used as well, including, nickel cadmium, nickel metal hydride, lithium-ion, zinc air, iron-sulfur, etc.

Operation of the electric mower 10 using the traction speed control system 90 will now be discussed in detail with respect to FIGS. 2–4.

Figure 2:
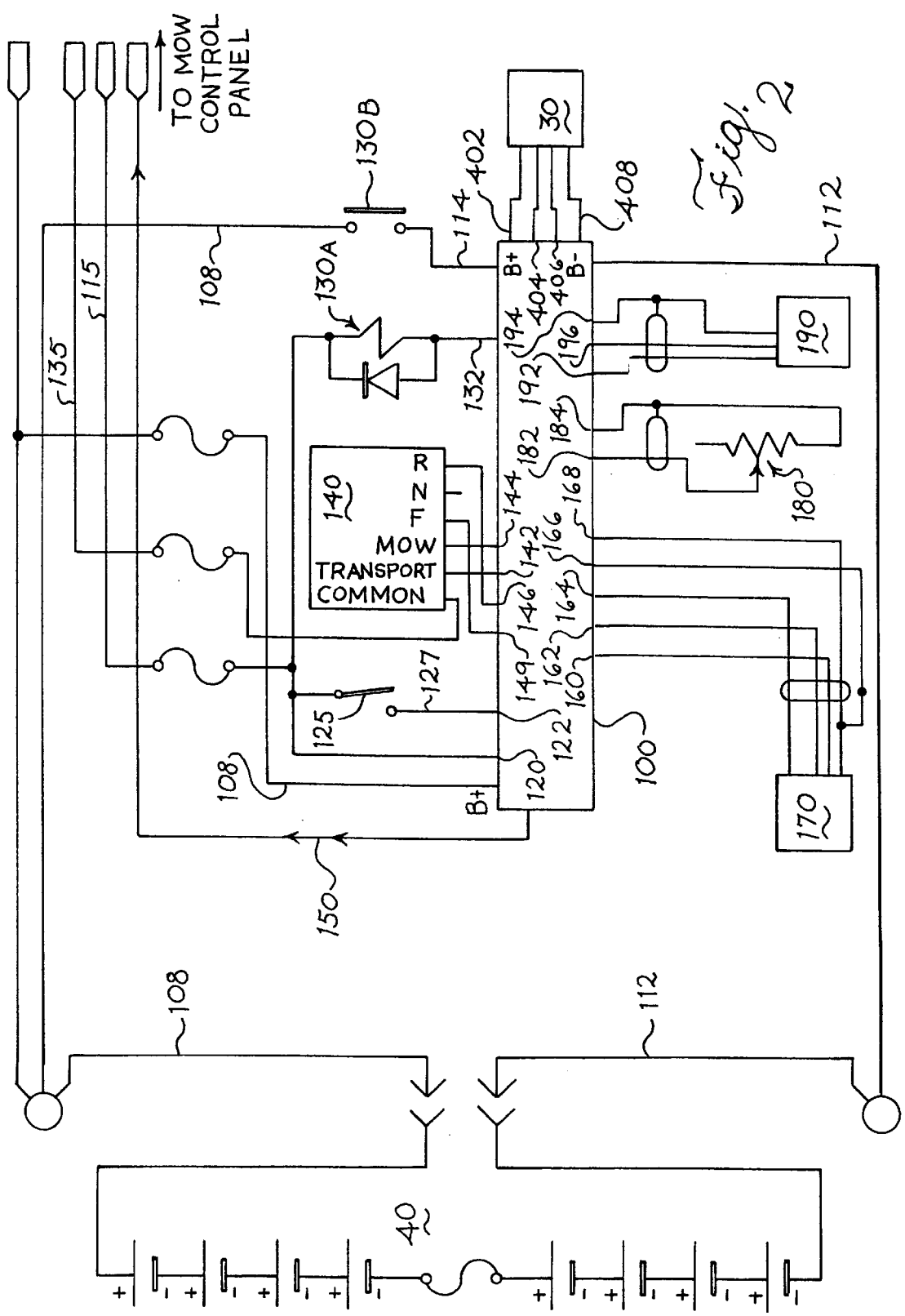
FIG. 2 is a schematic of the electric circuitry of the greens mower in FIG. 1 incorporating the traction speed control system of the present invention.
Figure 3:
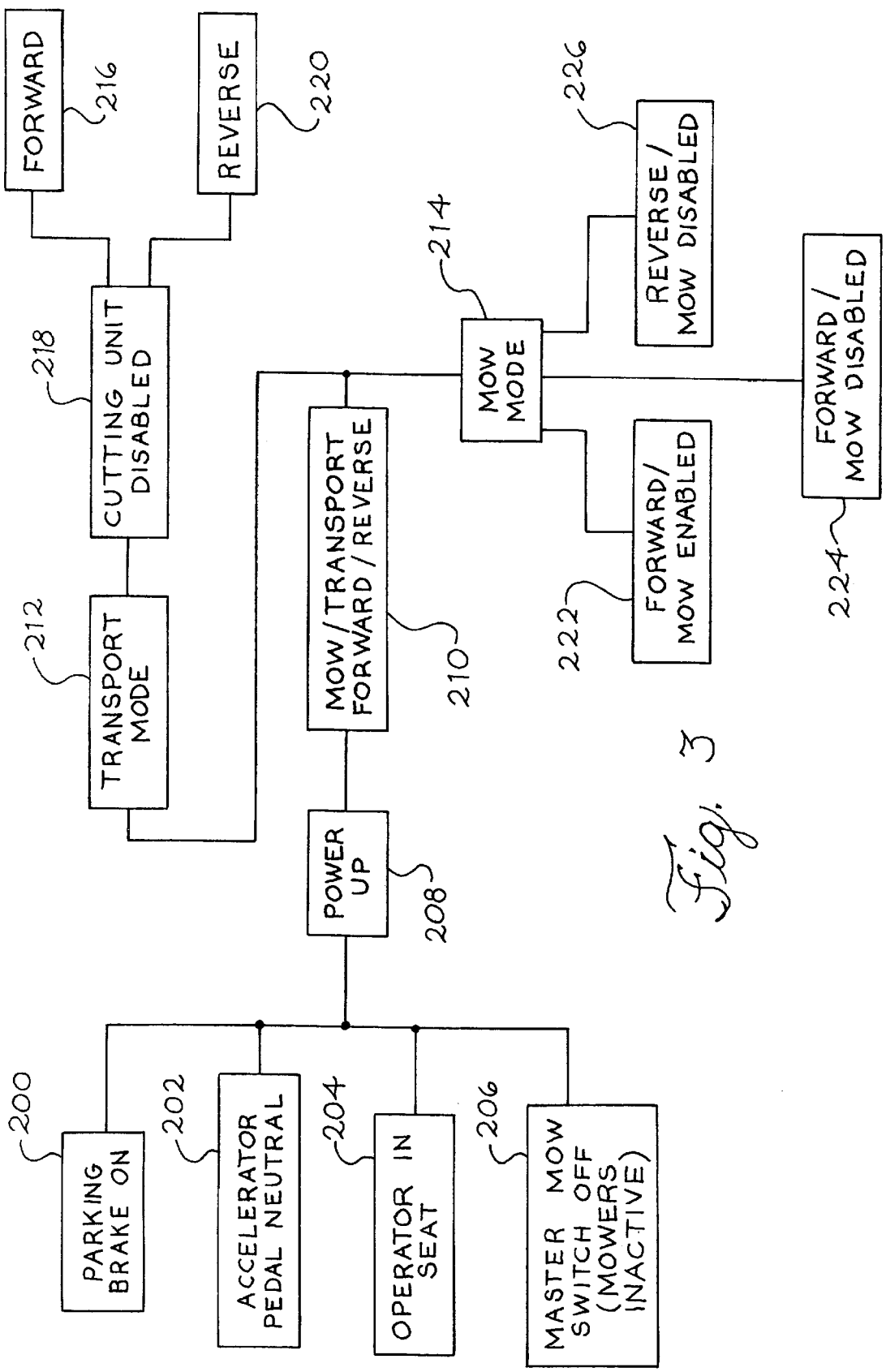
FIG. 3 is a flow chart showing the different modes of operation for the electric greens mower incorporating the traction speed control system of the present invention.

FIG. 2 shows a traction speed control system 90 (as shown in FIG. 1) including a controller 100 connected to the battery set 40, which provides 48 volts to the controller 100. When the operator turns the key in the ignition (not shown), an interlock system checks various signals to determine if certain preconditions to operation have been met. For example, the interlock system checks whether the operator is in the seat 95, whether the mowers are deactivated (a master mow switch is not active), and whether the brake is activated. As shown in FIG. 3, these preconditions to operation include the condition 200 that the brake must be on, the condition 202 that accelerator pedal must be in neutral, the condition 204 that an operator must be in the seat, and the condition 206 that the master mow switch must be off. It is only after all of these preconditions have been met that the interlock system is active and power is sent to controller 100 for power-up in state 208. Of course, other preconditions to operation that have not been specified could be programmed while still remaining within the spirit and scope of the invention.

Returning to FIG. 2, when the operator turns the key in the ignition, a signal on line 115 is sent to the controller 100. This signal is also sent to switch 125, which is a safety check to ensure that the operator's foot is not on the acceleration pedal. If the operator's foot is on the acceleration pedal, a signal on line 127 is sent to the controller 100 which issues a warning notification to the operator. The notification can be in the form of an LED or an audible alarm or any other suitable notification means. The signal on line 115 is also sent to relay 130. Once relay 130 receives power, the controller 100 can energize the relay coil 130A which closes the relay contacts 130B. Preferably, the power stage capacitors (not shown) internal to the controller 100 are pre-charged through a current limiting means in order to reduce arcing at the relay contacts 130B and eliminate other undesirable effects of not pre-charging. The relay contacts 130B provide the power to the drive stage of the controller 100.

When the controller 100 receives the signal on lines 108 and 120 and power has been applied, the controller 100 ensures that the voltage from the battery set 40 is between 88 percent and 112 percent of nominal battery volts. The controller 100 sends a mow enable signal on line 150 to the mower control panel (not shown). The interlock system (discussed above) is activated and sends a ready signal on line 135 to control shifter 140. The control shifter 140 sends signals to the controller 100 indicating in which direction and selection of mow or transport mode of the mower 10. The mower 10 of the current invention preferably has at least two speeds of operation: a mow speed that is variable up to 4 mph±0.5 mph when the mower 10 is mowing and the operator has depressed the accelerator pedal fully, and a transport speed that is variable up to 8–10 mph when the mower 10 is not mowing and the operator has depressed the accelerator pedal fully. The mower 10 also operates in reverse at a mow speed of up to 4 mph±0.5 mph when the operator has selected the reverse mode R from the control shifter 140 and has depressed the accelerator pedal fully. Although these speeds and modes have been described with respect to the presently disclosed embodiments, those skilled in the art will recognize that a controller 100 such as the SX Transistorized Motor Controller made by General Electric can be programmed for different operating modes and speeds and is not limited solely to those disclosed herein. For example, the maximum speed in both the mow and the transport mode could be higher or lower, or different restrictions could be placed on the mow mode and the reverse mode. The speeds and restrictions disclosed herein are illustrative only and should not be taken as limiting in any way.

If the operator elects to operate the mower at transport speed, i.e., up to 8–10 mph without operation of the reels 60, 61, or 62, the operator selects the transport T mode from the control shifter and signals on lines 142 and 149 are sent from the control shifter 140 to the controller 100. The signal on line 149 indicates operation in the forward direction, and the signal on line 142 indicates that the mower should operate in the "Transport" mode. If the operator elects to operate the mower at the "Mow" mode, i.e., up to about 4 mph with or without operating the reels, the controller 100 receives the signal on line 144 but does not receive the signal on line 142, thus indicating operation at the lower speed. If operating in reverse, the signal on line 144 is sent to the mower 10 to operate in the "Mow" mode, i.e., 4 mph at full accelerator stroke, and the signal on line 146 is sent to controller 100 to operate in "Reverse." In "Reverse," the controller ignores the signal sent from the "Transport" mode on line 142, because in the presently preferred embodiment, the mower 10 will not operate at transport speed (8–10 mph) in reverse. Due to the programmability of the controller 100, however, this restriction could be eliminated as needed by one skilled in the art.

During operation of the mower, the operator has access to a dashboard display 170. From that display 170, the operator can determine information relevant to the operation of the mower 10. Connections 160, 162, 164, 166 and 168 represent the transfer of information from the controller 100 to the dashboard display 170. Those skilled in the art will recognize that the selection of information available to the operator is a design choice. Such information can include operating speed, operating mode (i.e., forward, reverse, mow, transport), power indication, and power consumption, etc. The accelerator pedal and related accelerator control 180 are connected to the controller 100 via lines 182 and 184. In the presently disclosed embodiment, the accelerator input voltage signal is present on line 182, and the accelerator negative voltage signal is present on line 184. The tachometer 190 provides information relating to the rotational speed of the armature of the motor 30 to the controller 100. Voltage is supplied to the tachometer 190 through lines 192 and 194, and the tachometer provides information to the controller along input line 196.

Referring again to FIG. 3, once the operator has powered up the mower 10 in state 208, the available modes of operation are again described. If the operator chooses the transport mode, state 212, the following options exist. The mower can move forward (state 216) at a maximum of 10 mph with the cutting units disabled (state 218), or the mower can move in reverse (state 220) at 4 mph±0.5 mph, with the cutting units disabled (state 218). If the operator elects to move in mow mode (state 214), a different set of options are available. The mower can move forward at 4±0.5 mph with the cutting units enabled (state 222), it can move forward at 4±0.5 mph without the cutting units enabled (state 224), or it can move in reverse at 4±0.5 mph with the cutting units disabled (state 226). Under each operational circumstance, the controller 100 will sense the conditions and automatically adjust operation of the motor 30 so that it is in electrical balance and maintains a constant speed±0.5 mph. The ±0.5 mph limitation is related to design choices for various parts of the preferred embodiment only, however, and one skilled in the art could set other limits.

Figure 4:
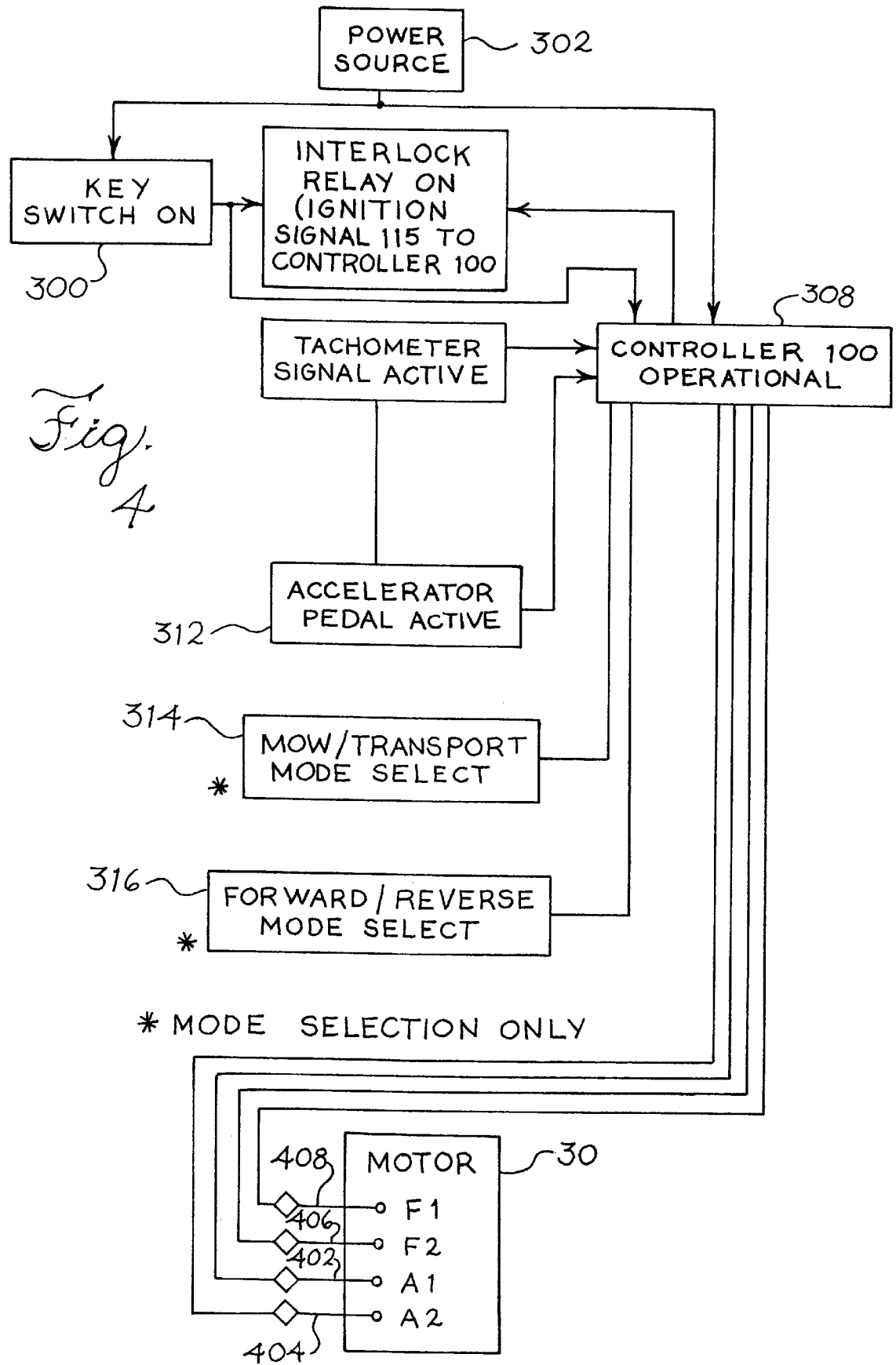
FIG. 4 is a flow chart showing the interfaces between the controller and the electric greens mower incorporating the traction speed control system of the present invention.

Referring now to FIG. 4, a flow chart showing the interfaces between the controller 100 and the mower 10 is shown. As discussed above, in order for the controller to be operational, certain preconditions must be met. In FIG. 4, these preconditions are represented as a key that is turned in the key switch 300, and a power source 302 that provides power to the interlock system 304. As previously discussed and shown in FIG. 3, the interlock system checks whether the parking brake is on 200, the accelerator pedal is in neutral 202, the operator is in the seat 204, and the master mow switch is off 206. In FIG. 4, once the interlock system 304 is activated, a signal is sent on line 115 (shown in FIG. 2) that activates the controller 100 as shown at 308. Once the controller 100 is operational, it receives control inputs from a number of sources. For example, if the mower 10 includes a tachometer 190 connected to the controller 100, the controller 100 can receive information relating to the speed of the rotation of the motor 30. In the mower 10, the accelerator pedal is operably connected to the accelerator control 180. As discussed with respect to FIG. 2, the accelerator control 180 provides information to the controller about the speed of the mower 10 through lines 182 and 184. This interrelation is shown in FIG. 4 at 312. The controller 100 also receives information from the operator's selection of the mow or transport mode 314 and the forward or reverse mode 316. With this information, the controller 100 can manipulate the field current on lines 406, 408 and the armature current on lines 402, 404 of the motor 30, and as discussed below.

Referring back to FIG. 2, operation of the traction speed control system 90 (shown in FIG. 1) including the controller 100, which in this embodiment is preferably the SX transistorized motor controller, will now be discussed.

The controller 100 is programmed to control both the armature and field currents independently to normally adjust for maximum efficiencies at certain operating parameters discussed below. In the preferred embodiment, the motor 30 is a separately excited DC shunt motor, since by independently controlling the field and armature currents in a separately excited motor, the best attributes of both a series and a shunt motor can be combined. Therefore, in the preferred embodiment, the field winding is connected separately from the armature and is, therefore, independent of variations in load and armature current. The controller 100 controls the armature current of the motor 30 on lines 402 and 404. Similarly, the controller 100 controls the field strength of the motor 30 on lines 406 and 408. After activation of the mow enable signal 150 indicating that all preconditions to operation of the mower 10 have been met, as discussed above, the operator directs operation of the mower 10 through the control shifter 140.

On level ground, the motor 30 is operated as a fixed field shunt motor. In a shunt motor the variation in armature speed from no load to full load does not exceed 10%. In the preferred embodiment, however, when additional torque is required, for example to climb non-level terrain, such as a hill on a golf course, the controller 100 increases the field current to provide a higher level of torque. With the additional torque obtained by increasing the field current, the mower 10 can maintain a steady speed even on an incline. Under these circumstances, the armature to field current ratio of the preferred separately excited motor 30 can be very similar to that of a comparable size series motor.

When starting from a stop either in "Transport" or "Mow" mode, the motor 30 of the present invention operates as a fixed field shunt motor. In other words, the controller 100 keeps the field current on lines 406 and 408 constant, and therefore, the torque developed from starting from a stop varies directly with the armature current on lines 402 and 404. As the load on the motor 30 increases, the motor speed slows down, thus reducing the back EMF which allows the armature current to increase and providing the greater torque needed to drive the mower 10 from a stop. When the mower 10 reaches its designated speed, preferably either "Mow" at about 4 mph or "Transport" at around 8–10 mph, the load on the motor 30 remains constant. Thus the speed of the motor 30 and the armature current 402 and 404 remain constant, and the motor 30 is in electrical balance.

If the mower 10 is operating at "Mow" mode and the operator decides to begin mowing operations, lowering the cutting units adds an additional load on the motor 30. The motor 30 reacts to the additional load by keeping the motor speed, and hence the mower speed, constant. The controller 100 increases the field current on lines 406 and 408 to provide increased torque to accommodate beginning mow operations.

When the operator is finished mowing and raises the cutting units, the motor 30 must again adjust for the change in load. The field current remains the same, but the motor speed and the back EMF increase, while the armature current and the torque decrease. Thus, whenever the load changes on the mower 10 of the present invention, either by changing velocity or by adding or removing the cutting units, the speed of the motor 30 changes also, but the controller 100 automatically adjusts the field strength and armature current until the motor is again in electrical balance.

If the operator directs the mower 10 to operate in reverse, when accelerating from a stop, the motor 30 behaves as a fixed field motor in the same manner as in the forward direction, discussed above. The field current on lines 406 and 408 is kept constant, and therefore, the torque developed on starting from a stop varies directly with the armature current on lines 402 and 404. As the load on the motor 30 increases the motor 10 speed slows, reducing the back EMF. The reduced back EMF of the motor allows the armature current to increase, providing the greater torque needed to power the mower 10 from a stop.

If the operator is operating at "Transport" speed or at "Mow" speed in either forward or reverse and wishes to slow down, when the accelerator is released, regenerative braking occurs in the motor 30. Regenerative braking is a system of dynamic braking in which the motor 30 is used as a generator and returns the energy of the armature and load to the electric system. Regenerative braking initiates a plugging signal by reversing the motor field. Plugging slows the vehicle to a stop when reversing the motor 30 by providing a small amount of retarding torque for deceleration. Once the current reaches a particular current level, the plugging mode transitions back to regenerative braking mode. The controller 100 keeps the motor 30 in regenerative braking mode as long as the motor 30 can maintain a regenerative current limit set in the controller 100. When the regenerative current drops below the level set in the controller 100, the regenerative braking mode transitions back to plugging mode. One of the major advantages of regenerative braking is longer motor life due to reduced motor heating.

Thus, the motor controller 100 provides for constant speed either when traveling on an incline or a decline. When operating the mower 10 on an incline, the field current on lines 406 and 408 is decreased to give the effect of "overdrive." This is called field weakening. Independent control of the field current on lines 406 and 408 by the controller 100 provides for infinite adjustments of "overdrive" levels, between the motor base speed and maximum weak field. When operating the mower 10 on a decline, the speed will also be constant. By its nature the shunt motor 30 will try to maintain a constant speed downhill. This characteristic, however, is enhanced because the controller 100 increases the field strength on lines 406 and 408 to the motor 30. As the armature rotation slows with the increase of current in the field, the motor speed decreases. Thus, no matter what the terrain, the mower 10 of the present invention will maintain a constant speed, thus creating a more even cut and preventing undesired effects such as marcelling.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive manner.

I claim:

1. An electrically powered mower comprising:
a frame;
a plurality of wheels to support the frame;
an electric motor operably connected to drive the plurality of wheels;
a power source operatively connected to the electric motor to provide power to the electric motor;
a plurality of cutting units mounted on the frame; and
a controller operably connected to the electric motor, the controller automatically making adjustments to motor currents or voltages as needed in order for the electrically powered mower to maintain a constant speed on non-level terrain.

2. The electrically powered mower of claim 1 wherein the controller adjusts an armature current of the electric motor depending upon a load on the electrically powered mower.

3. The electrically powered mower of claim 1 wherein the controller adjusts a field current of the electric motor when a variation in torque is required to maintain a constant speed of the electrically powered mower.

4. The electrically powered mower of claim 1 wherein the electric motor includes a shunt motor.

5. The electrically powered mower of claim 1 wherein the electric motor includes a series motor.

6. The electrically powered mower of claim 1 wherein the electric motor includes a separately excited DC shunt motor.

7. The electrically powered mower of claim 1 wherein the electric motor includes a switched reluctance motor.

8. The electrically powered mower of claim 1 wherein the electric motor includes a brushless DC permanent magnet motor.

9. The electrically powered mower of claim 1 wherein the electric motor includes a stepper motor.

10. The electrically powered mower of claim 1 wherein the electric motor includes an AC induction motor.

11. The electrically powered mower of claim 1 wherein the controller controls the electric motor such that the electric motor exhibits characteristics of a shunt motor.

12. The electrically powered mower of claim 1 wherein the controller controls the electric motor such that the electric motor exhibits characteristics of a series motor.

13. The electrically powered mower of claim 1 wherein the power source includes a battery.

14. The electrically powered mower of claim 13 wherein the battery includes a plurality of batteries.

15. The electrically powered mower of claim 14 wherein the plurality of batteries includes eight six-volt batteries.

16. The electrically powered mower of claim 1 wherein the power source includes a generator.

17. An electrically powered mower comprising:

a frame;

a plurality of wheels to support the frame;

an electric motor operably connected to drive the plurality of wheels;

a power source operatively connected to the electric motor to provide power to the electric motor;

a plurality of cutting units mounted on the frame;

a controller operably connected to the electric motor, the controller automatically making adjustments to motor currents or voltages as needed in order for the electrically powered mower to maintain a constant speed on non-level terrain; and a control shifter operably connected to the controller, the control shifter to relay operator commands to the controller relating to the speed and direction of the electrically powered mower.

18. An electrically powered mower comprising:

a frame;

a plurality of wheels to support the frame;

an electric motor operably connected to drive the plurality of wheels;

a power source operatively connected to the electric motor to provide power to the electric motor;

a plurality of cutting units mounted on the frame;

a controller operably connected to the electric motor, the controller automatically making adjustments to motor currents or voltages as needed in order for the electrically powered mower to maintain a constant speed on non-level terrain;

an interlock system operatively connected to the controller, the interlock system to monitor the presence of a plurality of preconditions to operation and prevent power being sent to the controller until all of the plurality of preconditions to operation are present; and a control shifter operably connected to the controller, the control shifter to relay operator commands to the controller relating to the speed and direction of the electrically powered mower.

19. The electrically powered mower of claim 14 wherein the plurality of preconditions to operation further comprises monitoring the presence of an operator in a seat.

20. The electrically powered mower of claim 14 wherein the plurality of preconditions to operation further comprises monitoring the position of a master mow switch.

21. The electrically powered mower of claim 14 wherein the plurality of preconditions to operation further comprises monitoring the position of a parking brake.

22. The electrically powered mower of claim 14 wherein the plurality of preconditions to operation further comprises monitoring the position of an accelerator pedal.

* * * * *

UNITED STATES PATENT AND TRADEMARK OFFICE
CERTIFICATE OF CORRECTION

PATENT NO. : 6,109,009
DATED : August 29, 2000
INVENTOR(S) : Terrance G. Benson

It is certified that error appears in the above-identified patent and that said Letters Patent is hereby corrected as shown below:

Title page, FOREIGN REFERENCES, "B-54961/91" should be --B-84961/91-.

Claims 19-22 should NOT be printed.

Signed and Sealed this

Seventh Day of August, 2001

*Attest:*

*Attesting Officer*

NICHOLAS P. GODICI
*Acting Director of the United States Patent and Trademark Office*